US012661782B2

(12) United States Patent
Hasegawa et al.

(10) Patent No.: US 12,661,782 B2
(45) Date of Patent: Jun. 23, 2026

(54) CONTROL DEVICE, CONTROL SYSTEM, ROBOT SYSTEM AND CONTROLLING METHOD

(71) Applicant: KAWASAKI JUKOGYO KABUSHIKI KAISHA, Kobe (JP)

(72) Inventors: Shogo Hasegawa, Kobe (JP); Tetsuya Yoshida, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 260 days.

(21) Appl. No.: 17/632,810

(22) PCT Filed: May 28, 2020

(86) PCT No.: PCT/JP2020/021234
§ 371 (c)(1),
(2) Date: Feb. 4, 2022

(87) PCT Pub. No.: WO2021/024586
PCT Pub. Date: Feb. 11, 2021

(65) Prior Publication Data
US 2022/0266449 A1 Aug. 25, 2022

(30) Foreign Application Priority Data
Aug. 5, 2019 (JP) ................................ 2019-143716

(51) Int. Cl.
*B25J 9/16* (2006.01)
(52) U.S. Cl.
CPC .................................. *B25J 9/1664* (2013.01)

(58) Field of Classification Search
CPC ........ B25J 9/1664; B25J 9/1689; B25J 13/00; B25J 9/161; B25J 9/1656; B25J 9/163;
(Continued)

(56) References Cited

U.S. PATENT DOCUMENTS 10,702,350 B2 * 7/2020 Hashimoto ............ B25J 9/0084
11,213,953 B2 * 1/2022 Lee ........................ B25J 9/1697
(Continued)

FOREIGN PATENT DOCUMENTS

JP 2013-071231 A 4/2013
JP 2014-50950 A 3/2014
(Continued)

*Primary Examiner* — Dylan M Katz
(74) *Attorney, Agent, or Firm* — METROLEX IP LAW GROUP, PLLC; Robert L. Scott, Esq.

(57) ABSTRACT

A robot control device includes a memory part configured to store storing operational information for causing the robot to perform a given operation, and a processing part configured to control operation of the robot by using the storing operational information as automatic operational information for causing the robot to perform an automatic work. The processing part is adapted to accept manipulational information for correcting the operation of the robot performing the automatic work using the automatic operational information, from a manipulating device, control the robot to perform operation corrected from the operation related to the automatic operational information, and store in the memory part corrected operational information for causing the robot to perform the corrected operation as the storing operational information. The manipulating device outputs to the processing part the manipulational information based on first operational information indicative of the operation of the manipulating device.

22 Claims, 8 Drawing Sheets

(58) Field of Classification Search
CPC ..... B25J 9/0081; B25J 9/1671; G05B 19/427;
G05B 19/42
See application file for complete search history.

(56) References Cited

U.S. PATENT DOCUMENTS

| | | | |
|---|---|---|---|
| 11,878,423 B2 * | 1/2024 | Hashimoto | ............ B25J 9/1682 |
| 2013/0345872 A1 * | 12/2013 | Brooks | ................. B25J 9/1676 |
| | | | 700/264 |
| 2014/0067128 A1 | 3/2014 | Kowalski et al. | |
| 2015/0217449 A1 * | 8/2015 | Meier | ................. G05D 1/0033 |
| | | | 901/1 |
| 2015/0336267 A1 * | 11/2015 | Sun | .................... G05B 19/0405 |
| | | | 901/41 |
| 2018/0243901 A1 | 8/2018 | Hashimoto et al. | |
| 2018/0319015 A1 * | 11/2018 | Sinyavskiy | ......... G05D 1/0088 |
| 2018/0354140 A1 | 12/2018 | Watanabe | |
| 2019/0202055 A1 * | 7/2019 | Wang | .................... B25J 9/1697 |
| 2019/0210228 A1 | 7/2019 | Kogan | |
| 2019/0358816 A1 | 11/2019 | Saito et al. | |
| 2021/0003993 A1 * | 1/2021 | Hashimoto | ............ B25J 13/025 |
| 2021/0154826 A1 | 5/2021 | Watanabe et al. | |
| 2021/0323151 A1 * | 10/2021 | Hashimoto | ............ B25J 9/1656 |
| 2022/0212340 A1 * | 7/2022 | Hasegawa | ............... B25J 9/163 |

FOREIGN PATENT DOCUMENTS

| | | | |
|---|---|---|---|
| WO | 2017/033356 A1 | 3/2017 | |
| WO | 2018/066602 A1 | 4/2018 | |
| WO | 2018/147411 A1 | 8/2018 | |
| WO | 2019/044766 A1 | 3/2019 | |

* cited by examiner

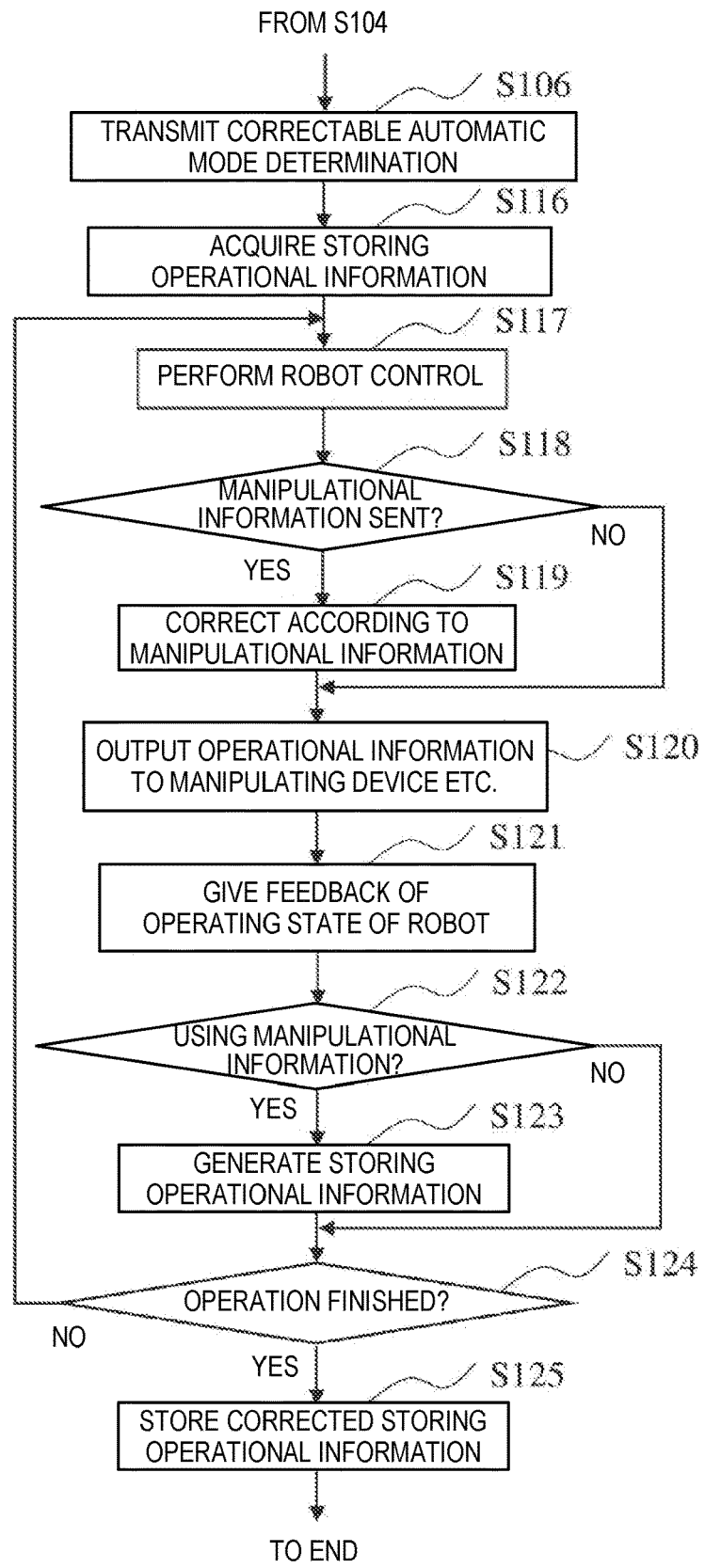

FROM S104

S106
TRANSMIT CORRECTABLE AUTOMATIC
MODE DETERMINATION

S116
ACQUIRE STORING
OPERATIONAL INFORMATION

S117
PERFORM ROBOT CONTROL

S118
MANIPULATIONAL
INFORMATION SENT?

YES          NO

S119
CORRECT ACCORDING TO
MANIPULATIONAL INFORMATION

S120
OUTPUT OPERATIONAL INFORMATION
TO MANIPULATING DEVICE ETC.

S121
GIVE FEEDBACK OF
OPERATING STATE OF ROBOT

S122
USING MANIPULATIONAL
INFORMATION?

YES          NO

S123
GENERATE STORING
OPERATIONAL INFORMATION

S124
OPERATION FINISHED?

NO          YES

S125
STORE CORRECTED STORING
OPERATIONAL INFORMATION

TO END

FIG. 5C

CONTROL DEVICE, CONTROL SYSTEM, ROBOT SYSTEM AND CONTROLLING METHOD

CROSS-REFERENCE TO RELATED APPLICATIONS

This application is a national stage entry of International Application No. PCT/JP2020/021234 filed on May 28, 2020, which claims priority based on the Article 8 of Patent Cooperation Treaty from the prior Japanese Patent Application No 2019-143716, filed on Aug. 5, 2019, the entire contents of all of which are incorporated herein by reference.

TECHNICAL FIELD

The present disclosure relates to a control device, a control system, a robot system, and a controlling method.

BACKGROUND ART

Conventionally, repeating works, such as welding, painting, assembly of components, and application of sealing agent, are automatically performed by industrial robots etc. at a production site. For example, in order to make the robot perform the works, teaching in which information necessary for the works is instructed to the robot and stored in the robot is needed. As a method of teaching the robot, for example, there are teachings, such as direct teaching in which a teacher directly touches and move the robot, remote-control teaching using a teaching pendant, teaching by programming, and master-slave teaching. For example, Patent Document 1 discloses one example of the teaching work in which an orbit of a work is stored in a robotic arm by direct teaching.

REFERENCE DOCUMENT OF CONVENTIONAL ART

Patent Document

[Patent Document 1] JP2013-071231A

DESCRIPTION OF THE DISCLOSURE

Problem(s) to be Solved by the Disclosure

From various reasons, it may become necessary to change a part of the operation taught to the robot. For example, when a work target or a work environment etc. of the robot changes partially from that when taught, it may become impossible for the robot to accomplish the target work, or a problem, such as the accuracy of the work getting worse, may occur. Moreover, a defect may be discovered in the work according to the teaching information created at the beginning. In such a case, it is necessary to correct the teaching information used for an automatic operation of the robot.

One purpose of the present disclosure is to provide a control device, a control system, a robot system, and a controlling method, capable of making a correction of a preset operation of a robot easier.

SUMMARY OF THE DISCLOSURE

In order to achieve the purpose, a control device according to one aspect of the present disclosure is a control device for a robot which includes a memory part configured to store information for causing the robot to perform a given operation as storing operational information, and a processing part configured to control operation of the robot by using the storing operational information as automatic operational information for causing the robot to perform an automatic work. The processing part is adapted to accept manipulational information for correcting the operation of the robot performing the automatic work using the automatic operational information, from a manipulating device configured to manipulate the robot, control the robot so that the robot performs operation corrected from the operation related to the automatic operational information, and store in the memory part corrected operational information for causing the robot to perform the corrected operation as the storing operational information. The manipulating device outputs to the processing part the manipulational information based on first operational information indicative of the movement of the manipulating device.

A control system according to another aspect of the present disclosure includes the control device according to one aspect of the present disclosure, and the manipulating device configured to manipulate the robot.

A robot system according to another aspect of the present disclosure includes the control device according to one aspect of the present disclosure, the robot, and the manipulating device configured to manipulate the robot.

A method of controlling a robot according to another aspect of the present disclosure is a method including the steps of operating the robot by using storing operational information that is information stored in a memory part and for causing the robot to perform a given operation as automatic operational information for causing the robot to perform an automatic work, accepting manipulational information for correcting the operation of the robot performing the automatic work using the automatic operational information, from a manipulating device configured to manipulate the robot, operating the robot based on the accepted manipulational information so that the robot performs operation corrected from the operation related to the automatic operational information, and storing in the memory part corrected operational information for causing the robot to perform the corrected operation as the storing operational information. The manipulating device outputs the manipulational information based on first operational information indicative of the movement of the manipulating device.

According to the technique of the present disclosure, it becomes possible to make the correction of the preset operation of the robot easier.

BRIEF DESCRIPTION OF DRAWINGS

FIG. 5C is a flowchart illustrating one example of operation for executing the operating mode of the robot system according to this embodiment.

MODE FOR CARRYING OUT THE DISCLOSURE

Figure 1:
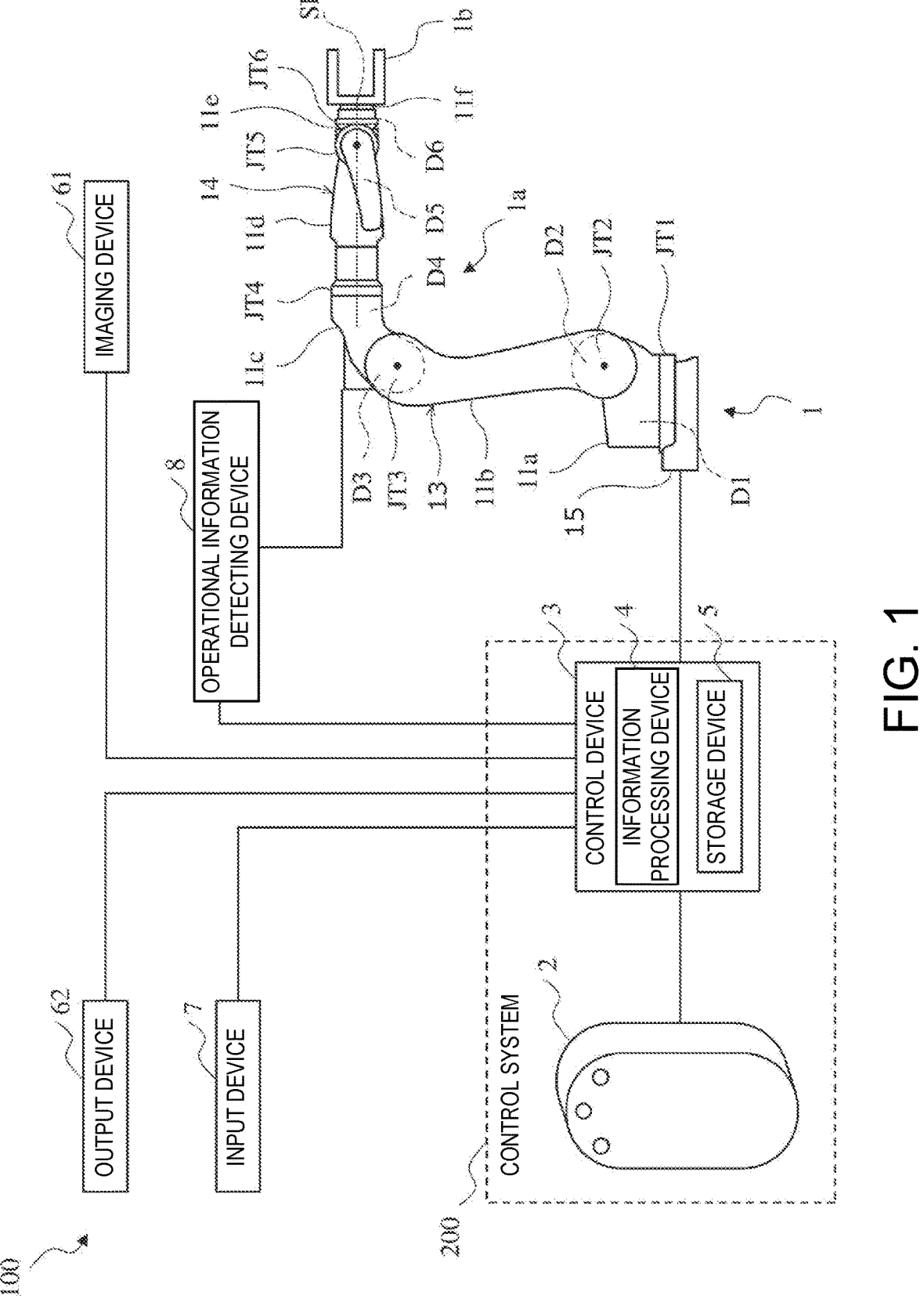
FIG. 1 is a view illustrating one example of a configuration of a robot system according to one embodiment.

Hereinafter, one embodiment of the present disclosure is described while referring to the drawings. Note that each embodiment which will be described below is to illustrate a comprehensive or concrete example. Components which are not cited in the independent claim that is the broadest concept among components in the following embodiments will be described as arbitrary components. Each drawing in the accompanying drawings is a schematic drawing, and is not necessarily illustrated exactly. Moreover, in each drawing, the same reference characters are assigned to the substantially same components, and therefore, redundant description may be omitted or simplified. The term "device" as used in this specification and the appended claims may mean a system including a plurality of devices, other than meaning a sole device.

(Configuration of Robot System 100)

A configuration of a robot system 100 according to one embodiment is described. FIG. 1 is a view illustrating one example of the configuration of the robot system 100 according to this embodiment. As illustrated in FIG. 1, the robot system 100 includes, as components, a robot 1, a manipulating device 2, a control device 3, an input device 7, an operational information detecting device 8, an imaging device 61, and an output device 62. The control device 3 includes an information processing device 4 and a storage device 5. The information processing device 4 is one example of a processing part, and the storage device 5 is one example of a memory part. Note that not all the components described above are essential. Alternatively, the manipulating device 2 may also serve as the input device 7. The robot 1 includes an acting part 1b which adds an operation to an object to be processed, and an operating part 1a which moves the acting part 1b so as to perform the operation concerned. The manipulating device 2 and the control device 3 constitute a control system 200 for controlling the robot 1.

The manipulating device 2 is a device for operating the robot 1, which outputs to the control device 3 manipulational information that is information inputted into the manipulating device 2. The control device 3 controls the entire operation of the robot system 100. The operational information detecting device 8 detects operational information indicative of operations of the operating part 1a and the acting part 1b of the robot 1, and outputs it to the control device 3. For example, the operational information detecting device 8 may include various sensors which detect information including the position and the posture of the acting part 1b, a force which the acting part 1b applies to the object, an image of the object, vibration, impact, light, sound, temperature, humidity, atmospheric pressure, etc. of the acting part 1b, as the operational information. The control device 3 outputs the operational information to the manipulating device 2 and the output device 62 for feedback and presentation of a state of the operation of the robot 1. The output device 62 converts the operational information into visual and aural information etc., and presents it to an operator of the manipulating device 2. For example, the image of the robot 1 imaged by the imaging device 61 may be outputted to the output device 62. Such an output device 62 can present the state of the robot 1 to the operator. Although one example of the output device 62 is a liquid crystal display, and an organic or inorganic electro luminescence (EL) display, it is not limited to these displays. The output device 62 may include a speaker which utters sound.

The robot 1 is a mechanical apparatus which is operated by a driving force. For example, the robot 1 includes robots for various applications, such as a construction machinery robot, a tunnel boring machine robot, a crane robot, a cargo conveyance vehicle robot, an industrial robot, a service robot, and a humanoid. The service robot is a robot used in various service industries, such as nursing, medical science, cleaning, guard, guidance, rescue, cooking, and goods offer. In this embodiment, the robot 1 is an industrial robot, such as a vertical articulated robot, a horizontal articulated robot, a polar coordinate robot, a cylindrical-coordinate robot, and a Cartesian-coordinate robot.

In this embodiment, the robot system 100 is a system utilizing master-slave robots. The manipulating device 2 constitutes a master machine and the robot 1 constitutes a slave machine. In the robot system 100, an instruction is inputted into the manipulating device 2 by the operator who is present at a position distant from a workspace of the robot 1 (outside the workspace) moving the manipulating device 2, and the robot 1 performs operation corresponding to the instruction concerned so as to perform a specific work. Further, in the robot system 100, the robot 1 can automatically perform a given work without the operator's manipulation using the manipulating device 2.

In this embodiment, the robot system 100 can cause the robot 1 to perform operation in a "manual mode," an "automatic mode," and a "correctable automatic mode." The "manual mode," the "automatic mode," and the "correctable automatic mode" do not include an instructing (may also be referred to as "teaching") operation for teaching the robot 1 operation such as the work etc.

The manual mode is an operating mode in which the robot 1 is operated according to the instruction inputted via the manipulating device 2. For example, the robot 1 performs operation according to the operator's manipulation inputted into the manipulating device 2 (i.e., operation which traces the manipulation concerned). The robot 1 is manually operated by the operator. Note that the manual mode includes a case where a part of the operation of the robot 1 under operation is automatically corrected based on the instruction inputted by the operator operating the manipulating device 2.

The automatic mode is an operating mode in which the robot 1 is operated according to a preset task program. The robot 1 performs an automatic operation for automatically executing a given operation according to the task program. The given operation may be individual operation, such as a horizontal movement, a vertical movement and a rotation, or may be a complex operation where a series of a plurality of individual operations are combined according to an execution sequence. Note that the individual operation may include a sole operation, or may include two or more operations. Examples of the complex operation are works, such as moving the object while holding the object, cutting the object, joining two or more objects, excavating. Therefore, in the automatic mode, the robot 1 performs the work automatically, in other words, the robot 1 can carry out the operation for automatically performing the work.

The correctable automatic mode is an operating mode in which, during the robot 1 operates automatically, the operation to be performed automatically is corrected by reflecting the manipulation of the manipulating device 2 to the automatic operation of the robot 1. That is, the robot 1 performs the automatic operation according to the preset task program in a state where the instruction inputted via the manipulating device 2 can be reflected. Therefore, in the correctable automatic mode, the operation of the robot 1 which performs the work automatically is correctable, in other words, the operation of the robot 1 which performs the automatic work is correctable. Note that the automatic mode is distinguished from the correctable automatic mode in that the manipulation of the manipulating device 2 is not reflected to the operation of the robot 1 during the automatic operation of the robot 1.

(Robot 1)

As illustrated in FIG. 1, the robot 1 includes a robotic arm as the operating part 1*a*, and an end effector as the acting part 1*b* which is attached to a tip end of the robotic arm 1*a*. Below, the reference characters "1a" and "1b" may also be indicated as "the robotic arm 1*a*" and "the end effector 1*b*." The operations of the robotic arm 1*a* and the end effector 1*b* are controlled by the control device 3.

The robotic arm 1*a* includes a pedestal 15, an arm part 13 supported by a support surface of the pedestal 15, and a wrist part 14 which is supported by a tip end of the arm part 13 and to which the end effector 1*b* is attached. The robotic arm 1*a* includes a plurality of links 11*a*-11*f* serially disposed from a base end to a tip end, joints JT1-JT6 which serially connect the links 11*a*-11*f*, and drives D1-D60 which rotate the joints JT1-JT6, respectively.

In the joint JT1, the pedestal 15 and a base-end part of the link 11*a* are coupled to each other so as to be pivotable on an axis extending in the vertical direction perpendicular to the support surface of the pedestal 15. In the joint JT2, a tip-end part of the link 11*a* and a base-end part of the link 11*b* are coupled to each other so as to be pivotable on an axis extending in the horizontal direction parallel to the support surface. In the joint JT3, a tip-end part of the link 11*b* and a base-end part of the link 11*c* are coupled to each other so as to be pivotable on an axis extending in the horizontal direction. In the joint JT4, a tip-end part of the link 11*c* and a base-end part of the link 11*d* are coupled to each other so as to be pivotable on an axis extending in the longitudinal direction of the link 11*c*. In the joint JT5, a tip-end part of the link 11*d* and a base-end part of the link 11*e* are coupled to each other so as to be pivotable on an axis perpendicular to the longitudinal direction of the link 11*d*. In the joint JT6, a tip-end part of the link 11*e* and a base-end part of the link 11*f* are twistably coupled to each other.

A mechanical interface includes the tip-end part of the link 11*f*. The end effector 1*b* corresponding to the type of the work is detachably attached to the mechanical interface via a force sensor SF. Although one example of the force sensor SF is an inner force sensor etc. and the configuration of the inner force sensor is not limited in particular, it may include a 3-axis acceleration sensor, for example. The force sensor SF detects a force which is acted on the object by the end effector 1*b*, as a reaction force which is received from the object concerned. The force detected by the force sensor SF is converted into force data by a suitable signal processor (not illustrated). This signal processor is provided to the force sensor SF or the control device 3, for example. In this specification, for convenience, it is expressed that the force sensor SF detects the force data.

The arm part 13 of the robotic arm 1*a* is formed by a coupling body including the joints JT1-JT3 and the links 11*a*-11*c*. The wrist part 14 of the robotic arm 1*a* is formed by a coupling body including the joints JT4-JT6 and the links 11*d*-11*f*.

Each of drives D1-D6 is one example of an actuator which relatively rotates two members coupled by one of the joints JT1-JT6. The drives D1-D6 include electric motors, such as servo motors, which are servo-controlled by the control device 3, as drive motors M1-M6 (see FIG. 6), respectively. Further, the drives D1-D6 include rotation sensors E1-E6 (see FIG. 6), such as encoders, which detect rotational positions of the drive motors M1-M6, and current sensors C1-C6 (see FIG. 6) which detect current for controlling the drive of the drive motors M1-M6, respectively. The rotation sensors E1-E6 and the force sensor SF constitute the operational information detecting device 8.

Note that the subscripts "1" to "6" of the drives D1-D6, the drive motors M1-M6, the rotation sensors E1-E6, and the current sensors C1-C6 mean that they are disposed at the joints JT1-JT6 with the same subscripts "1" to "6," respectively. Further, below, when an arbitrary joint is specified without distinguishing the joints JT1-JT6, the subscript is excluded and the joint is just referred to as "JT." The same is applied to the drive D, the drive motor M, the rotation sensor E, and the current sensor C.

(Manipulating Device 2)

As illustrated in FIG. 1, the manipulating device 2 is a device which is disposed, for example, outside the workspace of the robot 1 and receives a manipulational instruction from the operator. By moving the manipulating device 2, the manipulational information is generated, and the generated manipulational information is sent to the control device 3. For example, the manipulating device 2 converts the manipulational information inputted by the operator into a signal corresponding to the manipulational information concerned, and outputs it to the control device 3. When the manipulational information is sent to the control device 3 during operation in the manual mode, the robot 1 is controlled by the control device 3 so that it moves so as to follow the movement of the manipulating device 2. When the manipulational information is sent to the control device 3 during operation in the correctable automatic mode, the operation of the robot 1 is corrected using the manipulational information in the middle of automatic operation.

The manipulating device 2 is configured to be freely movable in arbitrary directions. In this embodiment, the manipulating device 2 is not fixed to other objects, such as the robot 1, but is configured to be freely movable in arbitrary directions in a three-dimensional space. Note that the manipulating device 2 may also be configured to be freely movable in arbitrary directions in a two-dimensional plane or on a one-dimensional straight line. The manipulating device 2 is configured to be grippable by the operator's hand. That is, the manipulating device 2 is a handheld manipulating device which is portable. For this reason, the operator can move the gripping manipulating device 2 in arbitrary directions and arbitrary postures. The manipulating device 2 is configured to communicate with the control device 3 via wired communications or wireless communications. The wired communications and wireless communications are not limited in types and may be any kind of communications.

Although not limited to this configuration, the manipulating device 2 may be a device having similar configuration to a general-purpose device, such as a game controller for a home video game machine, a remote control, or a smartphone, or may be a device for exclusive use, for example. For example, the device for exclusive use may be a device corresponding to the functions of the end effector 1*b* if the robot 1 is the industrial robot. If the end effector 1*b* is a spray gun for painting, the manipulating device 2 may be a gun-shaped device.

Figure 2:
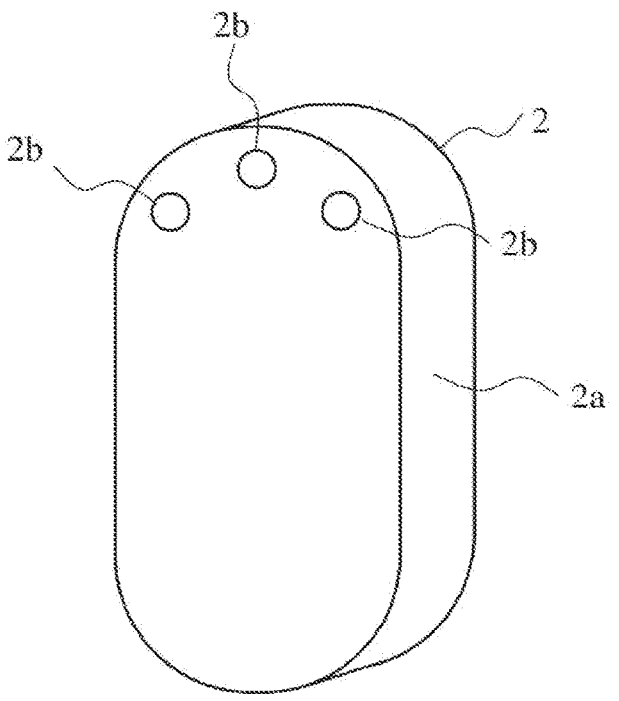
FIG. 2 is a view illustrating the appearance of one example of a manipulating device according to this embodiment.
Figure 3:
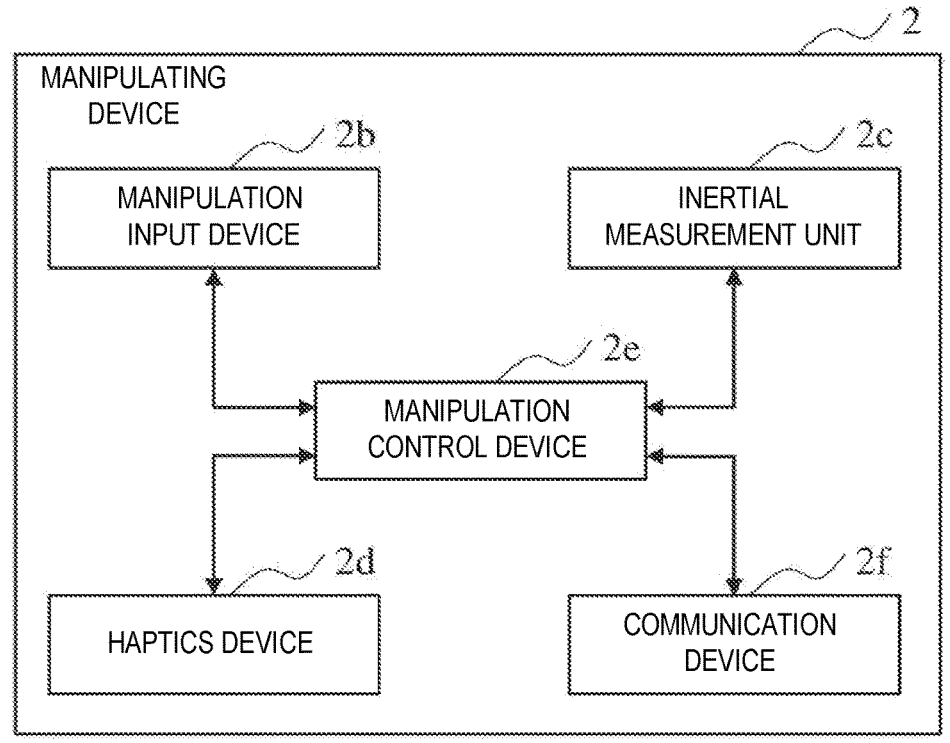
FIG. 3 is a block diagram illustrating one example of a configuration of the manipulating device according to this embodiment.

FIG. 2 is a view illustrating the appearance of one example of the manipulating device 2 according to this embodiment. FIG. 3 is a block diagram illustrating one example of the configuration of the manipulating device 2 according to this embodiment. As illustrated in FIG. 2, the manipulating device 2 includes a casing 2*a* which is grippable by a human hand. Further, the manipulating device 2 includes a manipulation input device 2*b* in the casing 2*a*. Although the manipulation input device 2*b* is a button switch in FIG. 2, it is not limited to this configuration. As illustrated in FIG. 3, the manipulating device 2 includes, inside the casing 2*a*, an inertial measurement unit (IMU) 2*c*, a haptics device 2*d*, a manipulation control device 2*e*, and a communication device 2*f*. In the robot system 100, the control device 3 performs a bilateral control to the robot 1 by using the manipulating device 2.

The manipulation input device 2*b* accepts an input, such as the instruction and information, by the operator, and transmits the inputted instruction and information to the control device 3 via the communication device 2*f*. Such a manipulation input device 2*b* may accept a physical input, an input of sound, an input of an image, etc. For example, the manipulation input device 2*b* may include devices, such as a slide switch, a button switch, a dial, a key, a lever, a touch panel, a microphone, and a camera. For example, the instruction and information inputted into the manipulation input device 2*b* may indicate a selection and an execution command of the operating mode of the robot 1, a selection and an execution command of the operation of the end effector 1*b*, etc.

The inertial measurement unit 2*c* includes a 3-axis acceleration sensor and a 3-axis angular velocity sensor, and detects an acceleration and an angular velocity of the manipulating device 2 in three axial directions. The manipulating device 2 transmits manipulational information based on measurement data of the accelerations and the angular velocities in the three axial directions measured by the inertial measurement unit 2*c*, to the control device 3 via the communication device 2*f*. Various information indicative of the movement and applied force of the manipulating device 2, such as the position, posture, movement, moving speed, acceleration, and force, based on the measurement data of the accelerations and the angular velocities in the three axial directions are detectable. For example, the manipulation control device 2*e* may convert the measurement data of the accelerations and the angular velocities in the three axial directions into the various information indicative of the movement and the applied force of the manipulating device 2, such as the position, posture, movement, moving speed, acceleration, and force, and may transmit the converted information to the control device 3 as the manipulational information. Alternatively, the manipulation control device

2*e* may output the measurement data itself to the control device 3 and the control device 3 may perform a calculation to convert the data concerned. The information converted from the measurement data of the inertial measurement unit 2*c* may indicate the position, posture, movement, moving speed, acceleration, applied force, etc. of the end effector 1*b*. The inertial measurement unit 2*c* may include a magnetic field sensor, a temperature sensor, etc. For example, the measurement data of the accelerations and the angular velocities in the three axial directions may be corrected using measurement data of the magnetic field sensor and the temperature sensor. Such information which the manipulation control device 2*e* transmits to the control device 3 is one example of first operational information that is information indicative of the movement of the manipulating device 2, and the manipulating device 2 outputs manipulational information based on the first operational information to the control device 3.

The haptics device 2*d* gives the operator a feedback of the operating state of the robot 1 as a tactile sense. The haptics device 2*d* receives the operational information on the robot 1 from the operational information detecting device 8 via the control device 3, and gives the operator a feedback of the operating state of the robot 1 based on the operational information concerned as a tactile sense. The haptics device 2*d* is one example of a perception device.

Here, the operational information includes operation data. The operation data includes at least one of the force data indicative of the force which the acting part 1*b* of the robot 1 applies to the object (i.e., a force which acts on the work environment, and the position data indicative of the position of the acting part 1*b* during operation. In this embodiment, the operation data includes both data. The force data may be time series data including a magnitude of the force and a time at which the force occurs such that they are associated with each other. The position data may be time series data including the information on the position and the time of the position such that they are associated with each other. The operation data including the force data and the position data may be time series data including the magnitude of the force, and the time at which the force occurs, information on the position, and the time of the position such that they are associated with each other. The position of the acting part 1*b* may also include the posture of the acting part 1*b* in the three-dimensional space, in addition to the position of the acting part 1*b* in the three-dimensional space. In this specification and the claims, the term "position" means that it includes at least the position in the three-dimensional space among the position in the three-dimensional space and the posture in the three-dimensional space.

The reason why the operational information includes the operation data as the essential information is that the control device 3 controls the operation of the robot 1 by controlling at least one of the "force" which the acting part 1*b* acts on the work environment and the "position" of the acting part 1*b* during operation. In this embodiment, for example, a command value of the position is a target value or correction value of the instructed "position," and a command value of the force is a target value or correction value of the instructed "force."

The operational information may include, as information other than the operation data, image picture data of the object to which the acting part 1*b* applies the operation, and oscillating data, impact data, light data, sound data, temperature data, humidity data, and pressure data such as atmospheric pressure which occur in the acting part 1*b*. At least the operation data among the operational information is sent to the manipulating device 2.

For example, the haptics device 2d includes an actuator, a controller, and a driver. The actuator is illustrated by an eccentric motor, a linear resonance actuator, and a piezo actuator, and gives the operator a tactile force sense. The controller may control the actuator via the driver, and may have the same configuration as the information processing device 4 which will be illustrated later. The driver constitutes an interface between the actuator and the controller. One example of the detailed configuration of the haptics device 2d is disclosed in JP4111278B2, JP2019-060835A, etc. Since it is known, detailed description is omitted. For example, in the haptics device 2d, the tactile force sense can be given to the operator while the operator is gripping the manipulating device 2 in the air. Examples of such a tactile force sense include a sense of the operator pushing by himself/herself, a sense of pulling by himself/herself, a sense of being pulled from the outside, a sense of being pushed from the outside, a sense of expansion, a sense of oppression, a texture indicative of the surface roughness of the object, and a pressure sense indicative of the hardness soft of the object.

The manipulation control device 2e controls the entire operation of the manipulating device 2. The manipulation control device 2e may have the same configuration as a configuration illustrating the information processing device 4 (described later). For example, the manipulation control device 2e receives a signal from the manipulation input device 2b, converts this signal into information indicative of corresponding operation, and transmits it to the control device 3. Further, the manipulation control device 2e converts the measurement data of the inertial measurement unit 2c, and transmits the converted data to the control device 3. Alternatively, the manipulation control device 2e transmits the measurement data of the inertial measurement unit 2c to the control device 3. The manipulation control device 2e receives the operational information on the robot 1 from the control device 3, converts the operation data included in the operational information into data which suits the input to the haptics device 2d, and outputs it to the haptics device 2d.

(Imaging Device 61 and Output Device 62)

As illustrated in FIG. 1, the imaging device 61 is an imaging device which images a work situation of the robot 1, and, for example, it is a digital camera or a digital camcorder. The output device 62 is a device for the operator to visually and/or aurally examine the work situation by the robot 1. The imaging device 61 is disposed in the space where the robot 1 is disposed, and the output device 62 is disposed in the space where the manipulating device 2 is disposed. The imaging device 61 and the output device 62 are connected to each other via the control device 3, and the image picture information imaged by the imaging device 61 is sent to the output device 62 via the control device 3. That is, the image captured by the imaging device 61 is displayed on the output device 62. The operator operates the manipulating device 2, while looking at the work situation of the robot 1 presented on the output device 62. Note that the imaging device 61 and the output device 62 may be directly connected to each other without having the control device 3 therebetween, or may be connected via another device. The imaging device 61 and the output device 62 may be connected to each other wiredly or wirelessly.

(Input Device 7)

Figure 4:
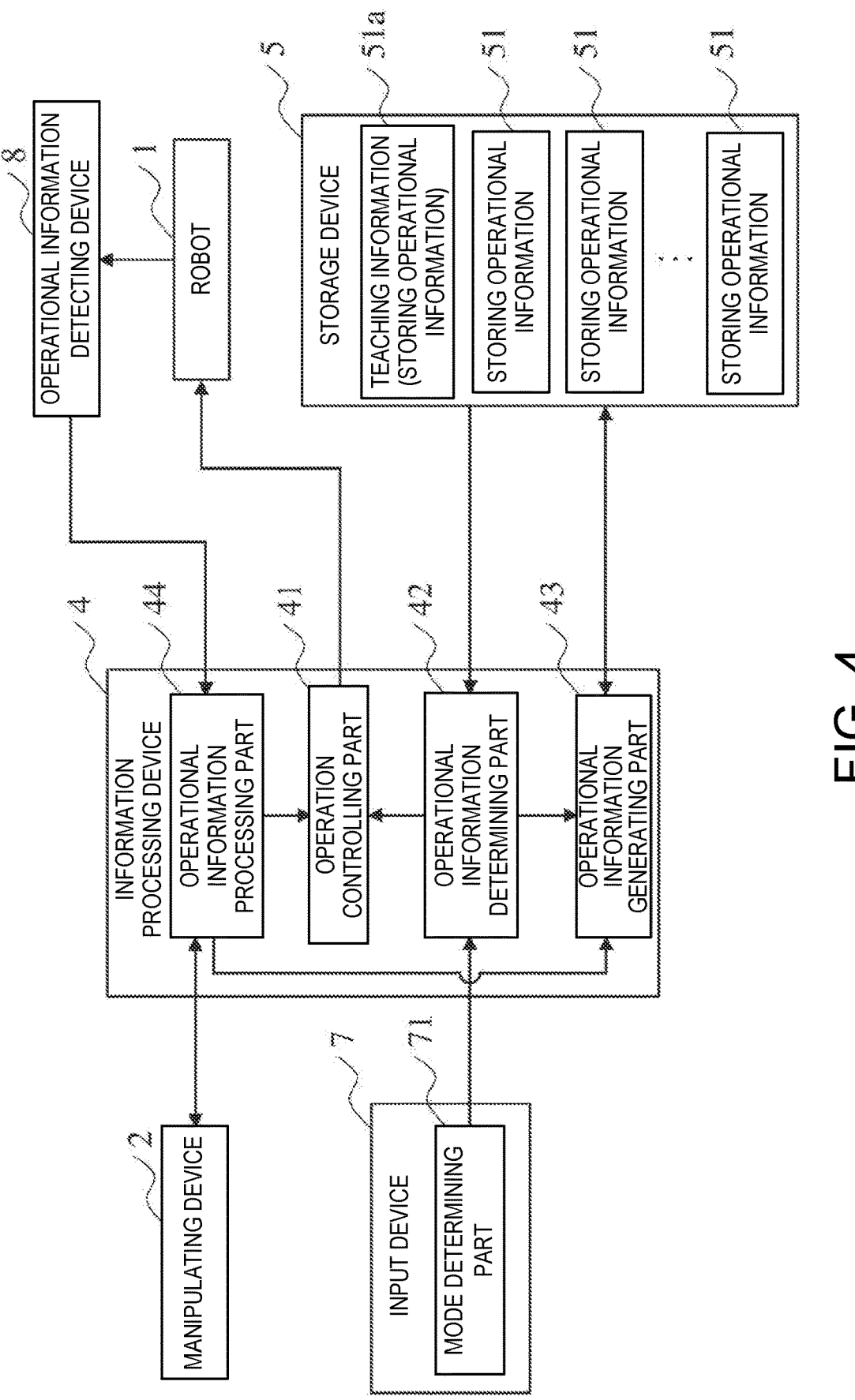
FIG. 4 is a block diagram illustrating one example of a functional configuration of the robot system according to this embodiment.

As illustrated in FIG. 1, the input device 7 is an input device which is installed outside the workspace along with the manipulating device 2, accepts the manipulational instruction from the operator, and inputs the accepted manipulational instruction into the control device 3. The input device 7 is configured to be operational, and, for example, it may include devices, such as a slide switch, a button switch, a dial, a key, a lever, a touch panel, a microphone, and a camera. The input device 7 may be a dedicated device for the robot system 100, or may be a device utilizing a general-purpose device. The input device 7 may be a dedicated terminal, or a terminal device such as a smart device such as a tablet. As illustrated in FIG. 4, the input device 7 includes a mode determining part 71 as a functional component. The mode determining part 71 determines the operating mode selected by the operator from the automatic mode, the correctable automatic mode, and the manual mode, as the operating mode in which the robot 1 is operated. Note that FIG. 4 is a block diagram illustrating one example of a functional configuration of the robot system 100 according to this embodiment.

(Storage Device 5)

As illustrated in FIGS. 1 and 4, the storage device 5 can store various information, and allow a read-out of the stored information. The storage device 5 is implemented by a storage device, such as a semiconductor memory such as a volatile memory and a nonvolatile memory, a hard disc drive (HDD), and a solid state drive (SSD). For example, the storage device 5 stores storing operational information 51 that is information on the operation of the robot 1. The storage device 5 stores at least one storing operational information 51. For example, the storing operational information 51 may be information for causing the robot 1 to automatically perform a given operation. The storing operational information 51 does not need to include all the information required for causing the robot 1 to automatically perform the given operation, and may also include a part of the information.

Such a storing operational information 51 may be automatic operational information that is information for causing the robot 1 to perform a given operation, such as operation for automatic work. The automatic operational information is information used during automatic operation of the robot 1. The storing operational information 51 may be teaching information 51a stored in the storage device 5 by operating the robot 1 so that the robot 1 performs a given work according to the taught work. Although the teaching information 51a is the stored information for instructing the operation of the robot 1 by operating the manipulating device 2 in this embodiment, it may be information stored by any kind of teaching method, such as direct teaching, without being limited to the configuration.

Note that the storing operational information 51 may be any kind of information, as long as it is information on the operation of the robot 1. For example, the storing operational information 51 may be orbital information including time series data, or may be path information indicative of pauses at discontinuous locations on the orbit. The storing operational information 51 may include a speed along the orbit of the robot 1, for example. Note that, although the storage device 5 is provided to the control device 3 so as to be integral with the information processing device 4 in this embodiment, it may be provided separately from the information processing device 4 (for example, provided to another device).

(Information Processing Device 4)

As illustrated in FIG. 1, the information processing device 4 controls the entire robot system 100. The information processing device 4 includes an arithmetic unit having a processor and a memory. The memory includes a semiconductor memory such as a volatile memory and a nonvolatile memory, and a storage device such as a hard disk drive and an SSD. The storage device 5 may also function as a memory. For example, the function of the arithmetic unit may be implemented by a computer system (not illustrated) including a processor such as a central processing unit (CPU), a volatile memory such as a random access memory (RAM), and a nonvolatile memory such as a read-only memory (ROM). A part or all of the function of the arithmetic unit may be implemented by the CPU executing a program recorded on the ROM using the RAM as a work area. Note that a part or all of the function of the arithmetic unit may be implemented by the computer system described above, or may be implemented by dedicated hardware circuitry such as an electronic circuit or an integrated circuit, or may be implemented by a combination of the computer system and the hardware circuitry. The information processing device 4 may execute each processing by a centralized control with a sole arithmetic unit, or may execute each processing by a distributed control with a collaboration of a plurality of arithmetic units.

The information processing device 4 may include a computer apparatus, such as a computer and a personal computer, for example. Alternatively, the information processing device 4 may include a microcontroller, a micro processing unit (MPU), a large scale integration (LSI), a system LSI, a programmable logic controller (PLC), and a logical circuit, for example. A plurality of functions of the information processing device 4 may be individually implemented by a sole chip, or may be implemented by a sole chip so as to include some or all the functions. Each circuit may be a general-purpose circuit or may be a circuit for exclusive use. As the LSI, a field programmable gate array (FPGA) which is programmable after the production of the LSI, a reconfigurable processor which is reconfigurable of connections and/or setup of circuit cells inside the LSI, or an application specific integrated circuit (ASIC) in which circuits for a plurality of functions are integrated in one piece for particular applications may be utilized.

As illustrated in FIG. 4, the information processing device 4 includes, as functional components, an operation controlling part 41, an operational information determining part 42, an operational information generating part 43, and an operational information processing part 44. The operational information determining part 42 determines operational information which is used by the operation controlling part 41 when operating the robot 1 in the automatic mode or the correctable automatic mode, among a plurality of storing operational information 51 for operating the robot 1 which is stored in the storage device 5. The operation controlling part 41 controls the operation of the robot 1.

The operational information generating part 43 generates new storing operational information by using a plurality of storing operational information 51 stored in the storage device 5. The operational information generating part 43 generates the new storing operational information by correcting the storing operational information based on the operational information on the robot 1 which is corrected based on the manipulational information on the manipulating device 2. The operational information processing part 44 receives the operational information on the robot 1 from the operational information detecting device 8, and outputs the operational information to the operation controlling part 41, the operational information generating part 43, and the manipulating device 2. Note that the operational information processing part 44 may output the operational information to the operation controlling part 41 in the automatic mode, and may output the operational information to the operation controlling part 41, the operational information generating part 43, and the manipulating device 2 in the manual mode and the correctable automatic mode. The operational information processing part 44 may output the operational information to the output device 62. The function of each functional component provided to the information processing device 4 can be implemented, for example, by the arithmetic part of the information processing device 4 reading and executing the program stored in the memory.

(Operation of Robot System 100)

Figure 5A:
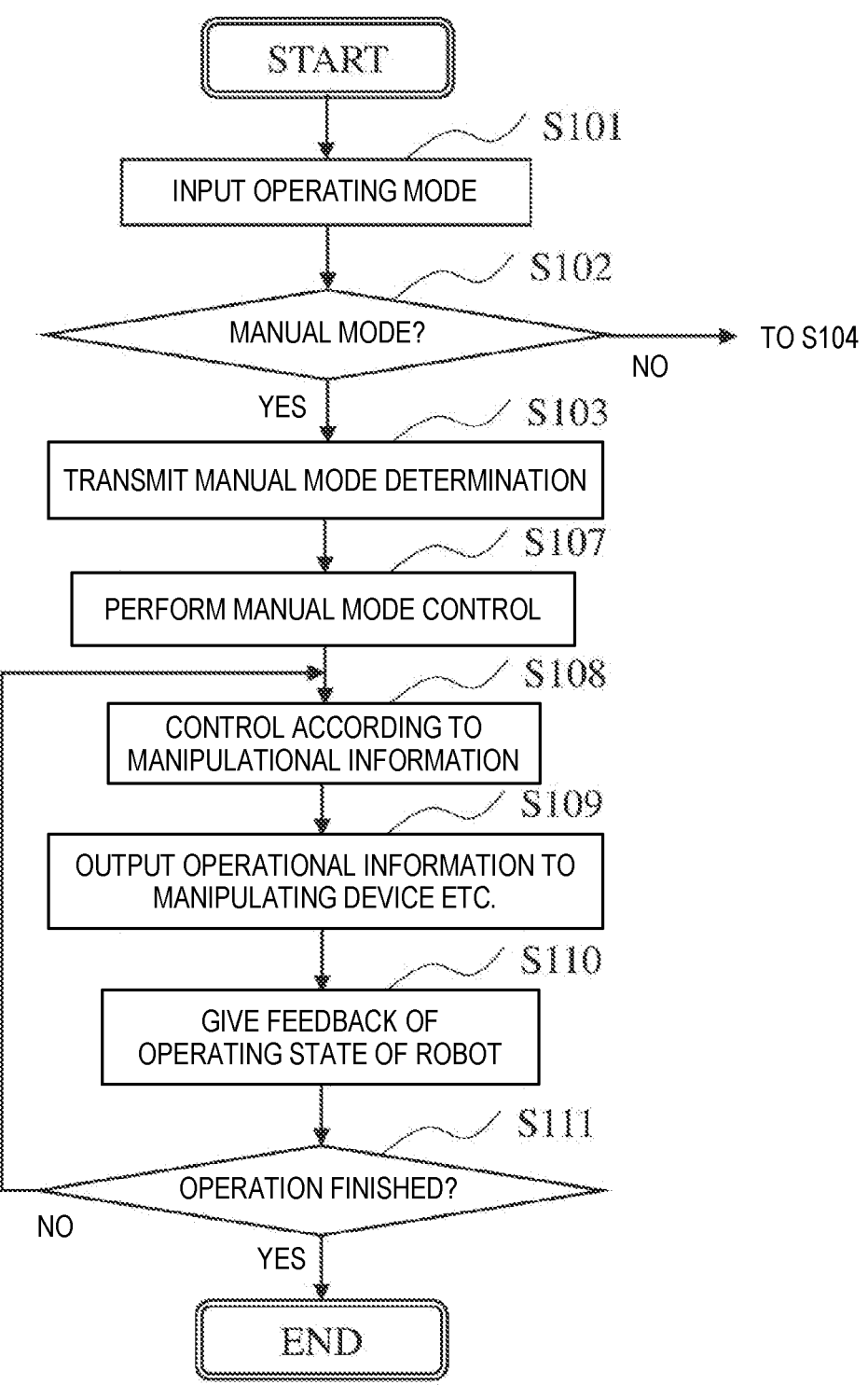
FIG. 5A is a flowchart illustrating one example of operation for executing an operating mode of the robot system according to this embodiment.
Figure 5B:
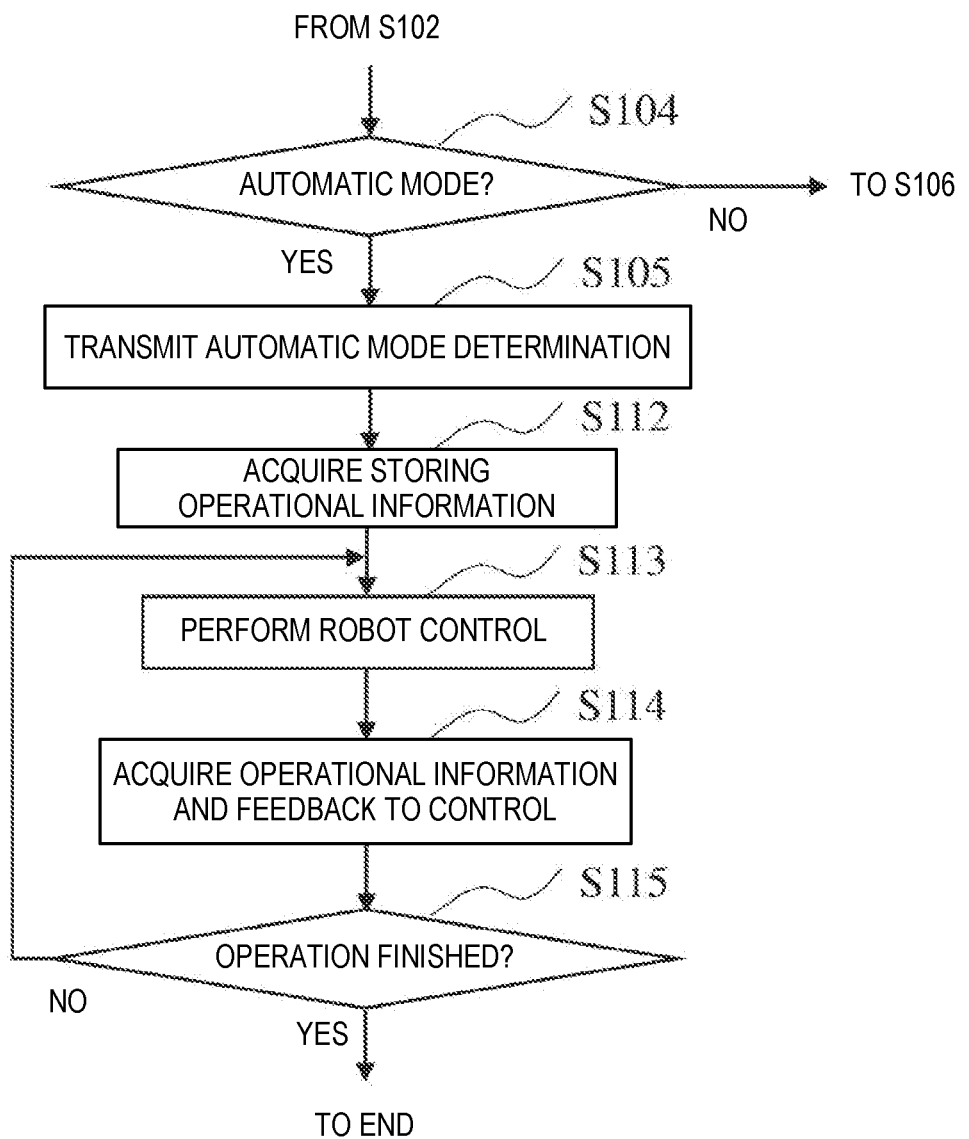
FIG. 5B is a flowchart illustrating one example of operation for executing the operating mode of the robot system according to this embodiment.

Operation of the robot system 100 according to this embodiment is described. In detail, operation of the information processing device 4 is described. FIGS. 5A to 5C are flowcharts illustrating one example of operation for executing the operating mode of the robot system 100 according to this embodiment. As illustrated in FIGS. 4 and 5A to 5C, the operator first inputs into the input device 7 the operating mode to be performed by the robot 1 (Step S101).

Next, the mode determining part 71 of the input device 7 determines whether the inputted operating mode is the manual mode (Step S102). If it is the manual mode (Yes at Step S102), it transits to Step S103, and if it is not the manual mode (No at Step S102), it transits to Step S104. At Step S104, the mode determining part 71 determines whether the inputted operating mode is the automatic mode, if it is the automatic mode (Yes at Step S104), it transits to Step S105, and if it is not the automatic mode (No at Step S104), it transits to Step S106.

At Step S103, the mode determining part 71 determines that the operating mode to be performed by the robot 1 is the manual mode, and transmits the determination result to the control device 3. Next, the operation controlling part 41 of the information processing device 4 performs the control of the robot 1 in the manual mode (Step S107).

Next, the operation controlling part 41 receives the manipulational information generated by the operator operating the manipulating device 2, and controls the operation of the robot 1 according to the manipulational information concerned (Step S108). At this time, the operation controlling part 41 does not use the storing operational information 51 of the storage device 5. Further, the operational information processing part 44 acquires the operational information on the robot 1 from the operational information detecting device 8, and outputs it to the operation controlling part 41 and the manipulating device 2 (Step S109). The operation controlling part 41 controls the robot 1 by using the operational information as the feedback information. The haptics device 2d of the manipulating device 2 gives the operator the feedback of the operating state of the robot 1 based on the operational information concerned as a stimulus, such as a tactile sense (Step S110).

Next, the operation controlling part 41 determines whether the operation of the robot 1 in the manual mode is finished (Step S111), and if finished (Yes at Step S111), the operation controlling part 41 ends the series of processings, and if not finished (No at Step S111), the operation controlling part 41 returns to Step S108.

At Step S105, the mode determining part 71 determines that the operating mode to be performed by the robot 1 is the automatic mode, and transmits the determination result to the control device 3. Next, the operational information determining part 42 of the information processing device 4 accesses and searches the storage device 5 to read and acquire the storing operational information 51 that is the automatic operational information corresponding to the work or the operation to be performed in the automatic mode (Step S112).

Next, the operation controlling part 41 controls the robot 1 by using the acquired storing operational information 51 (Step S113). At this time, the operation controlling part 41 controls the operation of the robot 1 according to the preset task program without using the manipulational information generated by the manipulating device 2. Further, the operational information processing part 44 acquires the operational information on the robot 1 from the operational information detecting device 8, and outputs it to the operation controlling part 41. The operation controlling part 41 controls the robot 1 by using the operational information as the feedback information (Step S114).

Next, the operation controlling part 41 determines whether the operation of the robot 1 in the automatic mode is finished (Step S115), and if finished (Yes at Step S115), the operation controlling part 41 ends the series of processings, and if not finished (No at Step S115), the operation controlling part 41 returns to Step S113.

Further, at Step S106, the mode determining part 71 determines that the operating mode to be performed by the robot 1 is the correctable automatic mode, and transmits the determination result to the control device 3. Next, the operational information determining part 42 of the information processing device 4 accesses and searches the storage device 5 to read and acquire the storing operational information 51 that is the automatic operational information corresponding to the work or the operation to be performed in the correctable automatic mode (Step S116).

Next, the operation controlling part 41 controls the robot 1 by using the acquired storing operational information 51 (Step S117). At this time, the operation controlling part 41 controls the operation of the robot 1 according to the preset task program, but when the manipulational information is sent from the manipulating device 2, the manipulational information concerned is used.

Next, the operation controlling part 41 determines whether the manipulational information is sent from the manipulating device 2 (Step S118), if it is sent (Yes at Step S118), it transits to Step S119, and if it is not sent (No at Step S118), it transits to Step S120. At Step S119, the operation controlling part 41 corrects the operation of the robot 1 which operates automatically, according to the sent manipulational information, and transits to Step S120. Therefore, the robot 1 performs operation related to the automatic operational information (i.e., operation corrected from operation to be performed automatically).

At Step S120, the operational information processing part 44 acquires the operational information on the robot 1 from the operational information detecting device 8, and outputs it to the operation controlling part 41 and the manipulating device 2. The operation controlling part 41 controls the robot 1 by using the operational information as the feedback information. The haptics device 2*d* of the manipulating device 2 gives the operator a feedback of the operating state of the robot 1 based on the operational information concerned as a stimulus, such as a tactile sense (Step S121).

Next, the operational information generating part 43 of the control device 3 determines whether the operational information acquired at Step S120 is the operational information in the control using the manipulational information (Step S122). If it is the operational information using the manipulational information (Yes at Step S122), it transits to Step S123, and if it is not the operational information using the manipulational information (No at Step S122), it transits to Step S124.

At Step S123, the operational information generating part 43 generates new storing operational information 51 by correcting the storing operational information 51 which the operation controlling part 41 uses, based on the operational information acquired at Step S120. In detail, the operational information generating part 43 may replace the operational information in the storing operational information 51, which corresponds to the operational information acquired at Step S120, by the operational information acquired at Step S120.

At Step S124, the operation controlling part 41 determines whether the operation of the robot 1 in the correctable automatic mode is finished, and if finished (Yes at Step S124), it transits to Step S125, and if not finished (No at Step S124), it returns to Step S117.

At Step S125, the operational information generating part 43 stores new corrected storing operational information 51 in the storage device 5. By repeating the processings of Steps S117-S124, the storing operational information 51 may be corrected more than once. The new corrected storing operational information 51 is information to which the more-than-one correction is reflected. Then, the operational information generating part 43 may replace (i.e., update) the storing operational information before the correction of the new storing operational information 51 stored in the storage device 5 by the new storing operational information 51. Note that, when the storing operational information 51 is not corrected, the operational information generating part 43 does not perform the storing in the storage device 5. After Step S125 is finished, the information processing device 4 ends the series of processings.

Figure 6:
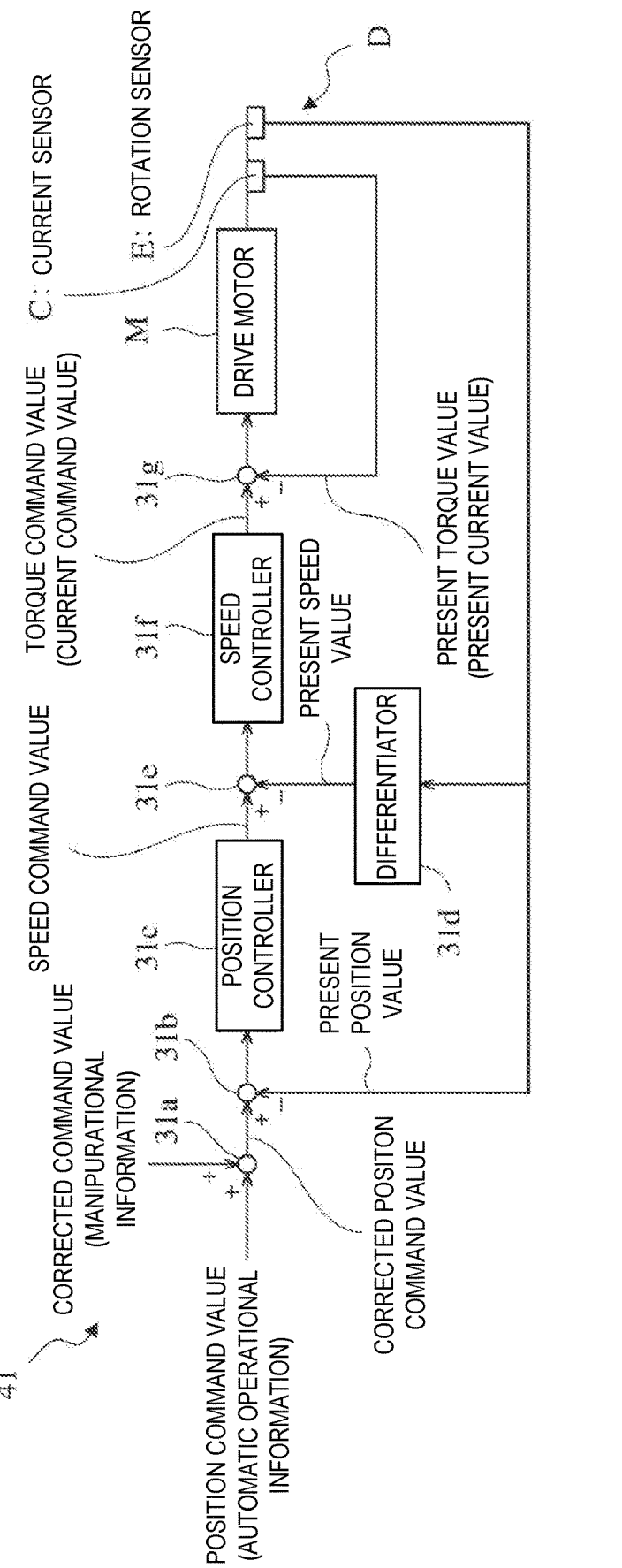
FIG. 6 is a block diagram illustrating one example of a functional configuration of an operation controlling part of an information processing device according to this embodiment.

Next, one example of processing of the information processing device 4 which corrects the operation of the robot 1 under operation in the correctable automatic mode is described. FIG. 6 is a block diagram illustrating one example of a functional configuration of the operation controlling part 41 of the information processing device 4 according to this embodiment. In this example, suppose that each of the automatic operational information and the manipulational information which are the storing operational information 51 is orbital information including time series data, for example.

As illustrated in FIG. 6, the operation controlling part 41 includes, as functional components, an adder 31*a*, a subtractors 31*b*, 31*e* and 31*g*, a position controller 31*c*, a differentiator 31*d*, and a speed controller 31*f*. The operation controlling part 41 controls the rotational position of the drive motor M of the drive D of the robot 1 in accordance with a command value based on the automatic operational information and a command value based on the manipulational information.

The adder 31*a* generates a corrected position command value by adding a correction command value based on the manipulational information to a position command value based on the automatic operational information. The adder 31*a* sends the corrected position command value to the subtractor 31*b*. For example, the position command value based on the automatic operational information may be a command value of the rotational position of each of the drive motors M1-M6 for fitting the three-dimensional position and posture of the end effector 1*b* to the position of the command value of the three-dimensional position and posture in the automatic operational information (i.e., a command value of the detection value of each of the rotation sensors E1-E6). The correction command value based on the manipulational information may be a command value of the rotation amount of each of the drive motors M1-M6 for moving the end effector 1b by a variation in the three-dimensional position and posture corresponding to the manipulational information (i.e., a command value of a variation in the detection value of each of the rotation sensors E1-E6). For example, the adder 31a may generate the position command value based on the automatic operational information and the correction command value based on the manipulational information from the automatic operational information and the manipulational information, respectively. Alternatively, the operation controlling part 41 may further include the functional component for performing the generation described above.

The subtractor 31b subtracts the present position value detected by the rotation sensor E from the corrected position command value to generate an angle deviation. The subtractor 31b sends the generated angle deviation to the position controller 31c. For example, the present position value may be a detection value of each of the rotation sensors E1-E6. The detection values of the rotation sensors E1-E6 indicate the three-dimensional position and posture of the end effector 1b.

The position controller 31c generates the speed command value based on the angle deviation sent from the subtractor 31b by a calculation based on a preset transfer function and a preset proportionality coefficient. The position controller 31c sends the generated speed command value to the subtractor 31e.

For example, the speed command value may be a command value of the rotational speed of each of the drive motors M1-M6.

The differentiator 31d differentiates the data of the present position value detected by the rotation sensor E to generate a variation in the rotation angle of the drive motor M per unit time (i.e., a current speed value). The differentiator 31d sends the generated current speed value to the subtractor 31e. For example, the current speed value may be a present value of the rotational speed of each of the drive motors M1-M6.

The subtractor 31e subtracts the current speed value sent from the differentiator 31d from the speed command value sent from the position controller 31c to generate a speed deviation. The subtractor 31e sends the generated speed deviation to the speed controller 31f. For example, the speed deviation may be a speed deviation of the rotational speed of each of the drive motors M1-M6.

The speed controller 31f generates a torque command value (present command value) based on the speed deviation sent from the subtractor 31e by a calculation based on a preset transfer function and a preset proportionality coefficient. The speed controller 31f sends the generated torque command value to the subtractor 31g. For example, the torque command value may be a torque command value for each of the drive motors M1-M6.

The subtractor 31g subtracts the present current value detected by the current sensor C based on the torque command value sent from the speed controller 31f to generate a current deviation. The subtractor 31g sends the generated current deviation to the drive motor M, and drives the drive motor M with the current value of the current deviation. For example, the current deviation may be a current deviation of each of the drive motors M1-M6.

Thus, the operation controlling part 41 controls the robot 1 so that the robot 1 performs the operation corrected from operation related to the automatic operational information by controlling each of the drive motors M1-M6 of the drives D1-D6. Note that, when the operating mode of the robot 1 is the automatic mode, the adder 31a sends the position command value based on the automatic operational information to the subtractor 31b as the corrected position command value. When the operating mode of the robot 1 is the manual mode, the adder 31a sends the position command value based on the manipulational information to the subtractor 31b as the corrected position command value.

Further, when the robot 1 performs the corrected operation, the operational information generating part 43 illustrated in FIG. 4 corrects the information corresponding to the operation concerned in the automatic operational information based on the result of the operation concerned of the robot 1. The operational information generating part 43 generates as new storing operational information 51 the corrected operational information that is automatic operational information after the correction, and stores it in the storage device 5. The corrected operational information is operational information for the robot 1 performing the corrected operation. As the result of the operation of the robot 1, the detection values of the rotation sensors E1-E6 may be used. Note that, when the robot 1 performs the corrected operation, the operational information generating part 43 may be configured to select whether the corrected operational information is to be stored in the storage device 5 as the storing operational information 51. In this case, for example, after the corrected operation of the robot 1 is finished, the operational information generating part 43 may be configured to inquire the input device 7, etc. whether to store the corrected operation.

The operation controlling part 41 may use the corrected operational information stored in the storage device 5 as the storing operational information 51, as the automatic operational information in subsequent operations. In this embodiment, the operation controlling part 41 is configured to control the operation of the robot 1 by using the latest storing operational information 51 stored in the storage device 5 as the automatic operational information.

Figure 7A:
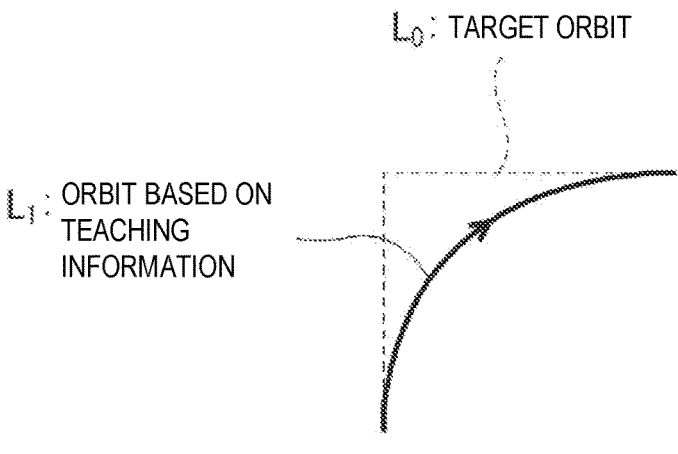
FIG. 7A is a view illustrating a concrete example of a correction of operation of a robot by the robot system according to this embodiment.
Figure 7B:
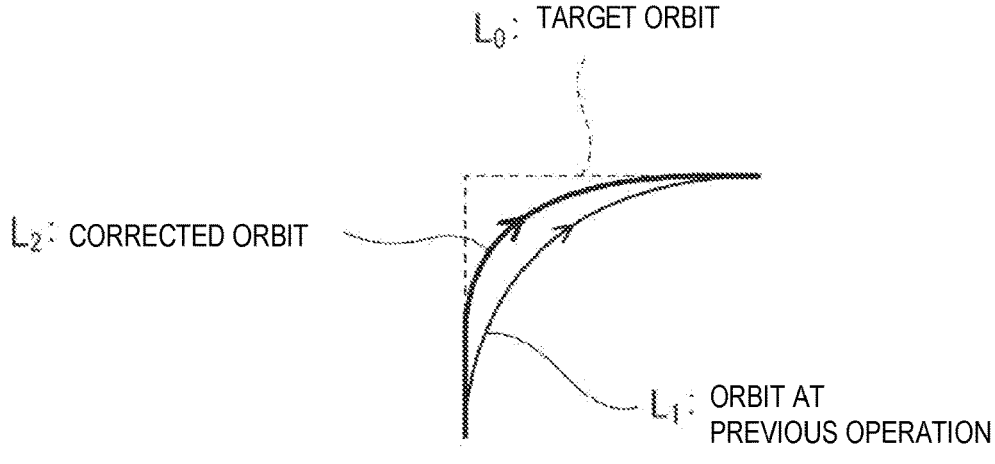
FIG. 7B is a view illustrating a concrete example of the correction of the operation of the robot by the robot system according to this embodiment.
Figure 7C:
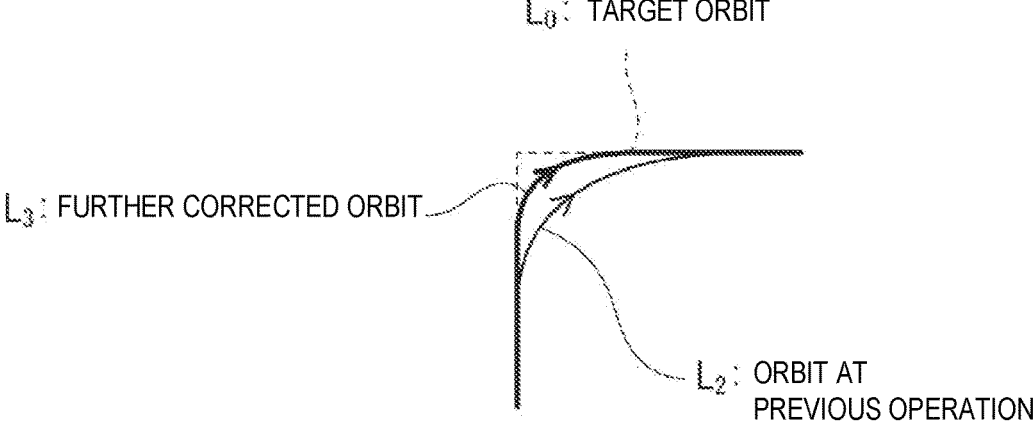
FIG. 7C is a view illustrating a concrete example of the correction of the operation of the robot by the robot system according to this embodiment.

Further, one concrete example of the correction of the operation of the robot 1 by the robot system 100 is described. FIGS. 7A to 7C are views illustrating the concrete example of the correction of the operation of the robot 1 by the robot system 100 according to this embodiment. FIGS. 7A to 7C illustrate one example in which an orbit of the robot 1 (that is, an orbit of the end effector 1b) is corrected to a target orbit L0 by the manipulating device 2 each time the robot 1 operates in the correctable automatic mode. In FIGS. 7A to 7C, the target orbit L0 is an orbit having a right angle and is illustrated by a broken line.

In the example of FIG. 7A, the robot 1 operates using the teaching information 51a as the automatic operational information, without being manipulated by the manipulating device 2. At this time, the end effector 1b moves on an orbit L1 illustrated by a thick solid line. It can be seen that the actual orbit L1 is partially deviated from the target orbit L0 (especially at the corner of the orbit L0).

In the example of FIG. 7B, the robot 1 operates by using the teaching information 51a as the automatic operational information while receiving the manipulation of the manipulating device 2. At this time, the operator operates the manipulating device 2 so that an amount of deviation from the target orbit L0 becomes smaller than the orbit L1 at the previous operation (the orbit of FIG. 7A). Then, the end effector 1b moves on an orbit L2 illustrated by a thick solid line. Note that the orbit L1 at the previous operation is illustrated by a thin solid line for reference.

In detail, the information processing device 4 operates the robot 1 in the correctable automatic mode by using the teaching information 51*a* as the automatic operational information. While the robot 1 operates using the automatic operational information, the operator operates the manipulating device 2 so that the end effector 1*b* approaches to the target orbit L0 from the previous orbit L1. Therefore, the orbit drawn by the end effector 1*b* is corrected from the orbit L1 to the orbit L2. Then, the information processing device 4 stores the corrected operational information for the end effector 1*b* operating so as to follow the orbit L2 in the storage device 5 as the storing operational information 51.

In this embodiment, the information processing device 4 is configured to control the operation of the robot 1 by using the latest storing operational information 51 stored in the storage device 5 as the automatic operational information. For this reason, when the manipulating device 2 is not operated at the next operation, the robot 1 operates so that the end effector 1*b* follows the orbit L2.

In the example of FIG. 7C, the robot 1 operates using the storing operational information 51 which follows the orbit L2 as the automatic operational information, while receiving the manipulation of the manipulating device 2. At this time, the operator operates the manipulating device 2 so that the amount of deviation from the target orbit L0 becomes smaller than the orbit L2 at the previous operation (the orbit of FIG. 7B). Then, the end effector 1*b* moves on an orbit L3 illustrated by a thick solid line. Note that the orbit L2 at the previous operation is illustrated by a thin solid line for reference.

In detail, the information processing device 4 operates the robot 1 in the correctable automatic mode, by using the storing operational information 51 which follows the orbit L2, as the automatic operational information. While the robot 1 operates using the automatic operational information, the operator operates the manipulating device 2 so that it approaches the target orbit L0 from the previous orbit L2. Therefore, the orbit drawn by the end effector 1*b* is corrected to the orbit L3 from the orbit L2. Then, the information processing device 4 stores in the storage device 5 the corrected operational information for operating the end effector 1*b* to follow the orbit L3, as the storing operational information 51.

Thus, the orbit of the robot 1 is corrected so as to approach the target orbit L0 each time the robot 1 is operated. When the orbit of the robot 1 is corrected to the target orbit L0 and a further correction is no longer needed, the operator selects, by the mode determining part 71, the automatic mode as the operating mode in which the robot 1 is operated, and causes the robot 1 to operate in a perfectly automatic manner.

Effects Etc.

As described above, in the robot system 100 according to this embodiment, the control device 3 of the robot 1 includes the storage device 5 as the memory part where the information for causing the robot 1 to perform the given operation is stored as the storing operational information 51, and the information processing device 4 as the processing part for controlling the operation of the robot 1 by using the storing operational information 51 as the automatic operational information for causing the robot 1 to perform the automatic work. The information processing device 4 receives, from the manipulating device 2 for manipulating the robot, the manipulational information for correcting the operation of the robot 1 which automatically performs the work using the automatic operational information, controls the robot 1 to perform the operation corrected from operation related to the automatic operational information, and stores in the storage device 5 the corrected operational information for the robot 1 performing the corrected operation as the storing operational information 51. The manipulating device 2 outputs the manipulational information based on first operational information indicative of the movement of the manipulating device 2 to the information processing device 4.

According to the above configuration, the control device 3 can correct on real time the operation of the robot 1 which performs the operation for the automatic work, by using the manipulational information based on the first operational information on the manipulating device 2. Such a control device 3 can easily correct a part of the operation of the robot 1. Further, the control device 3 stores the corrected operational information for performing the corrected operation in the storage device 5 as the storing operational information 51. For this reason, the control device 3 can make the robot 1 automatically perform the corrected operation, without requiring the correction of the operation which is to be performed each time by the same operation using the manipulating device 2. Further, the first operational information is generated by the operator moving the manipulating device 2. Therefore, the generation of the manipulational information by the operator is easier. Therefore, the correction of the preset operation of the robot 1, such as the operation taught to the robot 1, becomes easier.

Further, in this embodiment, according to the determination result by the mode determining part 71 of the input device 7, the information processing device 4 controls the robot 1 in any one of the manual mode, the automatic mode, and the correctable automatic mode. In the manual mode, the information processing device 4 can operate the robot 1, without using the storing operational information 51 stored in the storage device 5. In the automatic mode, the information processing device 4 operates the robot 1 according to the storing operational information 51 and, for example, even when the manipulating device 2 is operated unintentionally, it can prevent the operation of the robot 1 from being corrected.

Moreover, in the robot system 100 according to this embodiment, the manipulating device 2 may include the inertial measurement unit 2*c*, and may output the manipulational information based on the measurement data of the inertial measurement unit 2*c* as the first operational information. According to the above configuration, the manipulating device 2 outputs the manipulational information based on the first operational information indicative of the movement of the manipulating device 2. Since the manipulational information is information based on the measurement data of the inertial measurement unit 2*c*, it can exactly indicate the movement of the manipulating device 2. Therefore, the accuracy of the manipulational information improves and, thereby, the correction via the manipulating device 2 is reflected to the correction of the operation of the robot 1 with high accuracy.

Further, in the robot system 100 according to this embodiment, the manipulating device 2 may be configured to be freely movable in arbitrary directions. According to the above configuration, the manipulating device 2 can variously correct the operation of the robot 1.

Further, in the robot system 100 according to this embodiment, the manipulating device 2 may include the perception device which gives the operator who holds the manipulating device 2 a stimulus of perception. Further, the information processing device 4 may output second operational information indicative of the operation of the robot 1 to the perception device, and the perception device may give the operator the stimulus of perception corresponding to the operating state of the robot 1 based on the second operational information. Note that the perception device may be the haptics device 2*d* which gives the operator the stimulus of tactile sense. According to the above configuration, the control device 3 gives the operator the stimulus of perception in order to feed back the state of the operation of the robot 1 to the operator. The operator can recognize the state of the operation of the robot 1, such as the force acting on the end effector 1*b*, through his/her physical sense. Therefore, the operator can recognize the state of the robot 1 over his/her own operation easily and certainly. Further, the stimulus using the haptics device 2*d* can make the operator recognize various states.

Moreover, in the robot system 100 according to this embodiment, the information processing device 4 may control the operation of the robot 1 by using the latest storing operational information 51 stored in the storage device 5 as the automatic operational information. According to the above configuration, it becomes easier to bring the automatic operation of the robot 1 closer to the target operation as the operator repeats the correcting work of the robot 1 by using the manipulating device 2.

Note that the information processing device 4 does not necessarily need to use the latest storing operational information 51 stored in the storage device 5 as the automatic operational information. For example, the operational information determining part 42 of the information processing device 4 may determine the storing operational information 51 which the information processing device 4 uses as the automatic operational information, from a plurality of storing operational information 51 stored in the storage device 5. Note that, in this case, until the operational information determining part 42 determines the storing operational information 51 to be used as the automatic operational information, the information processing device 4 may use the same storing operational information 51 every time as the automatic operational information. According to this configuration, even if the latest storing operational information 51 stored in the storage device 5 is not optimal for the information for operating the robot 1, the operational information determining part 42 can determine the storing operational information 51 when the correction is made appropriately as the automatic operational information, and the information processing device 4 can use the storing operational information 51 concerned.

Further, in the robot system 100 according to this embodiment, the operational information generating part 43 of the information processing device 4 may generate the new storing operational information 51 by using a plurality of storing operational information 51 stored in the storage device 5. A method of generating the new storing operational information 51 by the operational information generating part 43 is not limited in particular, but an algorithm suitable for bringing closer to the target operation is adopted. For example, the operational information generating part 43 may be configured to generate the storing operational information 51 for performing the operation which is average of operations related to the plurality of stored storing operational information 51. In generating the new storing operational information 51, the operational information generating part 43 may delete the past storing operational information 51 which was used for generating the new storing operational information 51.

Moreover, the robot system 100 according to Embodiment 100 may include a situation information acquiring device (not illustrated) which acquires situation information indicative of a situation inside the workspace of the robot 1. The information processing device 4 may select and use the storing operational information 51 suitable for operating the robot 1 as the automatic operational information, based on the situation information acquired by the situation information acquiring device. The situation information may include information on the position and the posture of the robot 1 inside the workspace, and information used for recognizing a situation around the robot 1, for example. The information used for recognizing the situation around the robot 1 is a time window and a timing to operate the robot 1, a temperature and a humidity of the workspace, for example. For example, if the robot 1 is a sealing robot which applies sealing agent with viscosity, the viscous resistance of the sealing agent may change with the progress of the work time. In such a case, the information processing device 4 can correct the operation of the robot 1 more easily by selecting and determining the storing operational information 51 suitable for the viscous resistance of the sealing agent as the automatic operational information based on the situation information.

The control system 200 according to this embodiment includes the control device 3 according to this embodiment and the manipulating device 2 for manipulating the robot 1. Further, the robot system 100 according to this embodiment includes the control device 3 according to this embodiment, the robot 1, and the manipulating device 2 for manipulating the robot 1. According to each of the control system 200 and the robot system 100 which are described above, similar effects to the control device 3 according to this embodiment can be acquired.

Other Embodiments

As described above, although the examples of this embodiment of the present disclosure are described, the present disclosure is not limited to the embodiment described above. That is, various modifications and improvements are possible within the scope of the present disclosure. For example, those resulted from applying various modifications to the embodiment and those constructed by combining the components different embodiments are also encompassed in the scope of the present disclosure.

For example, although the manipulating device 2 includes the haptics device 2*d* in order to give the operator the stimulus of perception in this embodiment, it is not limited to this configuration. The manipulating device 2 may include any kind of devices which give the operator the stimulus of perception. For example, the manipulating device 2 may be configured to give the operator at least one of stimuli including tactile sense, thermal sense, vision, and hearing. The manipulating device 2 may give the stimulus of tactile sense by deformation of the manipulating device 2, such as expansion and contraction, extension and contraction, or vibration, and may include a device which expands and contracts with pneumatic or hydraulic pressure, and a device which causes vibration, such as a piezoelectric element, for example. The manipulating device 2 may give the stimulus of thermal sense by a generation of heat, and, it may include a heater, for example. The manipulating device 2 may give the visual stimulus by emitting and blinking light, and may include a light source, such as a light emitting diode (LED), for example. The manipulating device 2 may be configured to display an image corresponding to the stimulus of perception, and, for example, it may generate image data of the image concerned and transmit it to the control device 3 to display the image on the output device 62 etc. The manipulating device 2 may give the stimulus of hearing by generating audio, and, for example, it may include a speaker etc.

Further, although in this embodiment the manipulating device 2 includes the inertial measurement unit 2c for detecting the movement of the manipulating device 2, it is not limited to this configuration. For example, an imaging device for imaging the manipulating device 2 from outside may be provided to the manipulating device 2. The imaging device concerned may be configured to image the manipulating device 2 and object(s) around the manipulating device 2, such as the operator. By carrying out image processing of the image captured by such an imaging device, it is possible to detect the three-dimensional position and posture of the manipulating device 2 (for example, the position, posture, movement, moving speed, and acceleration of the manipulating device 2). By the acceleration, the applied force to the manipulating device 2 is detectable. Then, information detected by the image processing may be used as the manipulational information on the manipulating device 2. The image processing may be performed by the control device 3, or may be performed by other processors, such as a processor provided to the imaging device. Further, in order to detect the manipulational information on the manipulating device 2, the inertial measurement unit 2c and the imaging device may be used together. For example, initial states of the three-dimensional position and posture of the manipulating device 2 may be detected as initial information on the manipulational information by using the image which the imaging device imaged the manipulating device 2, and a variation from the initial state of the manipulating device 2 may be detected as the manipulational information by using the measurement of the inertial measurement unit 2c.

Further, although in this embodiment the control device 3 corrects the operation of the robot 1, such as the orbit and the operating speed, based on the manipulational information on the manipulating device 2, it is not limited to this configuration, and it may correct operation other than the above. For example, the control device 3 may correct one or more parameters related to operation other than the orbit and the operating speed of the robot 1 based on the manipulational information on the manipulating device 2. For example, the control device 3 may be configured to adjust the operational sensitivity of the robot 1 over the manipulation of the manipulating device 2, or may be configured to adjust a feedback rate of the force which the robot 1 receives to the manipulating device 2.

In the robot system 100 according to this embodiment, a plurality of manipulating devices 2 may be provided. For example, the plurality of manipulating devices 2 may include a first manipulating device for correcting the orbit of the robot 1, and a second manipulating device for adjusting the speed of the robot 1 along the orbit. For example, at a location where the orbit is necessary to be corrected, the orbit of the robot 1 may be corrected using the first manipulating device, while reducing the speed by using the second manipulating device. Therefore, the accuracy of the correction the orbit of the robot 1 improves. Further, when correcting the operation of the robot 1 according to the manipulational information outputted from two or more manipulating devices 2, the priority may be set for two or more manipulating devices 2, and the control device 3 may determine, according to the priority, the manipulational information to be adopted for the correction, from the manipulational information outputted from the two or more manipulating devices 2. Alternatively, the control device 3 may apply processing, such as addition, subtraction, averaging, or other statistical procedures, to the manipulational information outputted from the two or more manipulating devices 2, and may adopt the processed manipulational information for the correction.

Moreover, the art of the present disclosure may be a controlling method. For example, the controlling method according to the present disclosure is a method of controlling the robot, which includes using the storing operational information that is information stored in the memory part and for causing the robot to perform the given operation, as the automatic operational information for causing the robot to perform the automatic work to operate the robot. The method also includes accepting the manipulational information for correcting the operation of the robot which performs the automatic work using the automatic operational information, from the manipulating device for manipulating the robot, and based on the accepted manipulational information, operating the robot so that the robot performs the operation corrected from operation related to the automatic operational information. The method also includes storing in the memory part the corrected operational information for the robot to perform the corrected operation as the storing operational information. The manipulating device outputs the manipulational information based on the first operational information indicative of the movement of the manipulating device. According to this controlling method, similar effects to the control device 3 etc. described above can be acquired. Such a controlling method may also be implemented by circuitry such as a CPU and an LSI, an IC card, or a sole module.

The art of the present disclosure may be a program for implementing the controlling method described above, or may be a nontransitory recording medium which records the program described above and is computer-readable. It is needless to say that the program described above can be distributed via a transmission medium, such as the Internet.

Further, all the numbers, such as the ordinal number and the quantity, used in the above are to illustrate in order to concretely describe the art of the present disclosure, and therefore, the present disclosure is not limited to the illustrated numbers. Moreover, the relations of connection between the components are to illustrate in order to concretely describe the art of the present disclosure, and therefore, the relations of connection which realize the functions of the present disclosure are not limited to the relations.

The division of the block in the functional block diagram is one example, and therefore, a plurality of blocks may be realized as one block, one block may be divided into a plurality of blocks, and/or a part of the functions may be transferred to other blocks. Further, the functions of a plurality of blocks having similar functions may be processed by sole hardware or software in a parallel or time-dividing manner.

What is claimed is:

1. A control device for a robot having a robot arm and an end-effector, comprising:

an input device for receiving, before operation of the robot, an operating mode input representing a selection between operating modes comprising an automatic mode and a correctable automatic mode;

a memory part configured to store operational information comprising a preset task program for causing the robot to perform a given operation according to the operating mode input, the operational information comprising information on an orbit of the end effector; and a processing part configured to perform operations comprising operations to control the operation of the robot based on the stored operational information as automatic operational information for causing the robot to perform an automatic work according to the preset task program to approach a target orbit, wherein according to the operating mode input being the correctable automatic mode, the processing part is configured to perform operations further comprising:

accepting manipulation information for correcting the operation of the robot performing the automatic work using the automatic operational information, from a controller, the manipulation information correcting movement of the end effector on the stored orbit to a corrected orbit that more closely approaches the target orbit;

generating corrected operational information based on the manipulation information and part of the stored operational information;

controlling the robot based on the corrected operational information so that the robot performs operation corrected from the operation related to the automatic operational information;

determining whether the target object is sufficiently approached based on the controlling the robot;

based on a determination that the target object is not sufficiently approached, receiving a selection to not store in the memory part the corrected operational information for causing the robot to perform the corrected operation and repeating the accepting the manipulation information and the generating the corrected operational information; and based on a determination that the target object is sufficiently approached receiving a selection comprising a selection to store in the memory part the corrected operational information for causing the robot to perform the corrected operation, the stored corrected operation information replacing the stored operational information as the automatic operational information for causing the robot to perform the automatic work, the corrected operational information comprising information on the corrected orbit that updates the stored information on the orbit of the end effector, according to the operating mode input being the automatic mode, the processing part is configured to perform operations further comprising operations to control the robot to perform the automatic work using the automatic operational information without accepting the manipulation information; and the controller outputs to the processing part the manipulation information indicative of the movement of the controller.

2. The control device of claim 1, wherein the controller includes an inertial measurement unit, and outputs the manipulation information based on measurement data of the inertial measurement unit.

3. The control device of claim 1, wherein the controller is configured to be freely movable in arbitrary directions.

4. The control device of claim 1, wherein the controller comprises a handheld controller that includes a perception device configured to provide a stimulus of perception, wherein the processing part outputs perception information indicative of the operation of the robot to the perception device, and wherein the perception device provides the stimulus of perception corresponding to an operating state of the robot based on the perception information.

5. The control device of claim 4, wherein the perception device comprises an actuator that provides a stimulus of tactile sense.

6. The control device of claim 1, wherein the processing part controls the operation of the robot by using the latest stored operational information stored in the memory part as the automatic operational information.

7. The control device of claim 1, wherein the memory part stores a plurality of pieces of stored operational information, and wherein the processing part determines the stored operational information to be used as the automatic operational information from the plurality of pieces of stored operational information stored in the memory part.

8. The control device of claim 1, wherein the memory part stores a plurality of pieces of stored operational information, and wherein the processing part generates new stored operational information by using the plurality of pieces of stored operational information stored in the memory part.

9. A control system, comprising:

the control device of claim 1; and the controller.

10. A robot system, comprising:

the control device of claim 1;

the robot; and the controller.

11. A method of controlling a robot having a robot arm and an end-effector, comprising:

receiving, before operation of the robot, an operating mode input representing a selection between operating modes comprising an automatic mode and a correctable automatic mode; and controlling the robot by using stored operational information that is information stored in a memory part comprising a preset task program for causing the robot to perform a given operation according to the received operating mode input, the operational information comprising information on an orbit of the end effector, the stored operational information comprising automatic operational information for causing the robot to perform an automatic work according to the preset task program to approach a target orbit; wherein, according to the received operating mode input being the correctable automatic mode, operating the robot comprises:

accepting manipulation information for correcting the operation of the robot performing the automatic work using the automatic operational information, from a controller, the manipulation information correcting movement of the end effector on the stored orbit to a corrected orbit that more closely approaches the target orbit;

generating corrected operational information based on the manipulation information and part of the stored operational information;

controlling the robot based on the corrected operational information so that the robot performs operation corrected from the operation related to the automatic operational information; determining whether the target object is sufficiently approached based on the controlling the robot;

based on a determination that the target object is not sufficiently approached, repeating the accepting the manipulation information and the generating the corrected operational information, receiving a selection to not store in the memory part the corrected operational information for causing the robot to perform the corrected operation; and based on a determination that the target object is sufficiently approached receiving an input selection comprising a selection for storing in the memory part corrected operational information for causing the robot to perform the corrected operation, the stored corrected operation information replacing the stored operational information as the automatic operational information for causing the robot to perform the automatic work, the corrected operational information comprising information on the corrected orbit that updates the stored information on the orbit of the end effector, according to the operating mode input being the automatic mode, operating the robot comprises performing the automatic work using the automatic operational information without accepting the manipulation information; and the controller outputs the manipulation information indicative of the movement of the controller.

12. The control device of claim 2, wherein the controller is configured to be freely movable in arbitrary directions.

13. The control device of claim 12, wherein the controller comprises a handheld controller that includes a perception device configured to provide a stimulus of perception, wherein the processing part outputs perception information indicative of the operation of the robot to the perception device, and wherein the perception device provides the stimulus of perception corresponding to an operating state of the robot based on the perception information.

14. The control device of claim 13, wherein the perception device comprises an actuator that provides a stimulus of tactile sense.

15. The control device of claim 2, wherein the controller comprises a handheld controller that includes a perception device provides a stimulus of perception, wherein the processing part outputs perception information indicative of the operation of the robot to the perception device, and wherein the perception device provides the stimulus of perception corresponding to an operating state of the robot based on the perception information.

16. The control device of claim 15, wherein the perception device comprises an actuator that provides a stimulus of tactile sense.

17. The control device of claim 3, wherein the controller comprises a handheld controller that includes a perception device that provides a stimulus of perception, wherein the processing part outputs perception information indicative of the operation of the robot to the perception device, and wherein the perception device provides the stimulus of perception corresponding to an operating state of the robot based on the perception information.

18. The control device of claim 17, wherein the perception device comprises an actuator that provides a stimulus of tactile sense.

19. The control device of claim 6, wherein the memory part stores a plurality of pieces of stored operational information, and wherein the processing part generates new stored operational information by using the plurality of pieces of stored operational information stored in the memory part.

20. The control device of claim 7, wherein the memory part stores a plurality of pieces of stored operational information, and wherein the processing part generates new stored operational information by using the plurality of pieces of stored operational information stored in the memory part.

21. The control device of claim 1, wherein the operational information comprises a speed of the end effector along the orbit, and the corrected orbit includes a corrected speed of the end effector along the corrected orbit.

22. The method of controlling a robot according to claim 11, wherein the operational information comprises a speed of the end effector along the orbit, and the corrected orbit includes a corrected speed of the end effector along the corrected orbit.

* * * * *